Sept. 21, 1965 A. R. LUCAS 3,208,055

MAGNETIC MEMORY DEVICE AND SYSTEM

Filed Oct. 21, 1960 6 Sheets-Sheet 1

*INVENTOR.*
ALFRED R. LUCAS
*BY*
Kegan, Bellamy & Kegan
ATTORNEYS

Sept. 21, 1965 A. R. LUCAS 3,208,055

MAGNETIC MEMORY DEVICE AND SYSTEM

Filed Oct. 21, 1960 6 Sheets-Sheet 3

United States Patent Office 3,208,055
Patented Sept. 21, 1965

3,208,055

MAGNETIC MEMORY DEVICE AND SYSTEM

Alfred R. Lucas, Lakewood, Ohio, assignor to International Telephone and Telegraph Corporation, New York, N.Y., a corporation of Maryland

Filed Oct. 21, 1960, Ser. No. 64,093
8 Claims. (Cl. 340—174.1)

This invention relates to magnetic memory devices and to systems wherein they are incorporated. Reference is made to applicant's co-pending application entitled "Magnetic Memory Device," Serial No. 123,074, filed June 19, 1961, and assigned to the assignee of this invention. That co-pending application relates particularly to the magnetic circuit shown in this application.

An object of the invention is a new and improved signalling system, incorporating a new and improved magnetic memory and readout device.

A more specific object is to provide magnetic memory structure which has reading heads which read out stored information bits by reliably and effectively closing contact members which render unnecessary the amplifying apparatus ordinarily required for reading information out of a magnetic memory device.

Heretofore, magnetic memory devices of the general character with which this invention deals have been provided in the form of a recording medium comprising a magnetizable tape, disc, or drum. For the most part, the force exertable by a premagnetized portion of such a recording medium has been very small, rendering it necessary to employ considerable amplification in order to receive reliably readable indications therefrom. Attempts to overcome this drawback, such as distributing magnetizable bits over the surface of the recording medium, with each magnetizable portion secured in a cutout opening through the medium, have been provided with rather complex and expensive reading and writing heads, causing such devices to meet with disfavor.

According to the invention, the foregoing and other drawbacks of the prior structures are overcome by providing sizable magnetizable memory members dispersed over the surface of the drum in intersecting rows which comprise levels when the drum is upright. Each memory member is composed of a ferro-magnetic alloy capable of a relatively high energy storage. Each level has a magnetizable writing head and a laterally displaced reading head. The writing heads are able to magnetize selected ones of the memory members with either of two polarities, and for reading heads are forcefully influenced by magnetized memory members selected for reading, whereby reading-head contact points are opened or closed according to memory-member polarity.

Further according to the invention, the magnetic memory device takes the form of the nonmagnetic drum having a series of longitudinally extending radial slots cut into the surface thereof, with a series of spaced-apart magnetic memory members inserted in each slot. In the illustrative example, there are fifty slots evenly spaced around the circumference of the drum, and each slot accommodates five inserted memory members evenly spaced apart along the slot, providing five 50-member levels, giving two hundred fifty magnetic memory members carried by the drum. Their outer faces define a cylinder coincident with the surface of the drum.

Features of the invention are that each writing head, of which one is provided for each level of memory members, has poles arranged to match with respective pole portions of any selected memory member of the level, and that each reading head, of which one is provided for each level, includes a permanent magnet which has poles arranged to confront respective pole portions of any memory member of the level brought opposite the permanent magnet of the reading head. The four-pole arrangement causes the reading-head permanent magnet to be forceably attracted or repelled radially according to the polarity with which a selected memory member has been magnetized.

Further according to the invention, the improved magnetic memory device is employed in a new and improved information storage and readout system of which an outstanding feature is that only a minimum of control relay apparatus is required for cooperation with the improved memory device to provide a system which replaces conventional structures many times more bulky and expensive.

A special feature of the improved system includes a stepping switch for rotarily positioning the drum responsive to digit-key and control-key operations.

The above-mentioned and other objects and features of this invention and the manner of attaining them will become more apparent, and the invention itself will be best understood, by reference to the following description of an embodiment of the invention taken in conjunction with the accompanying drawings, comprising FIGS. 1 to 11, wherein:

FIGS. 1 to 4 comprise a circuit diagram according to the invention, with FIG. 1 showing key set and lamp equipment employed at one of a number of stations served by the system;

FIG. 2 shows the tens and units registers TR and UR of the system;

FIG. 3 discloses control-relay, keyboard, and indicating-lamp apparatus of the structure;

FIG. 4 discloses a rotary stepping switch controlled by the registers of FIG. 2 to position the magnetic memory drum of FIGS. 5 and 6, together with writing-head and reading-head structure, along with signal lamps IN and MESS;

FIG. 11, on the same sheet with FIG. 1, shows how the sheets on which

Figures 5, 5A, 5B:
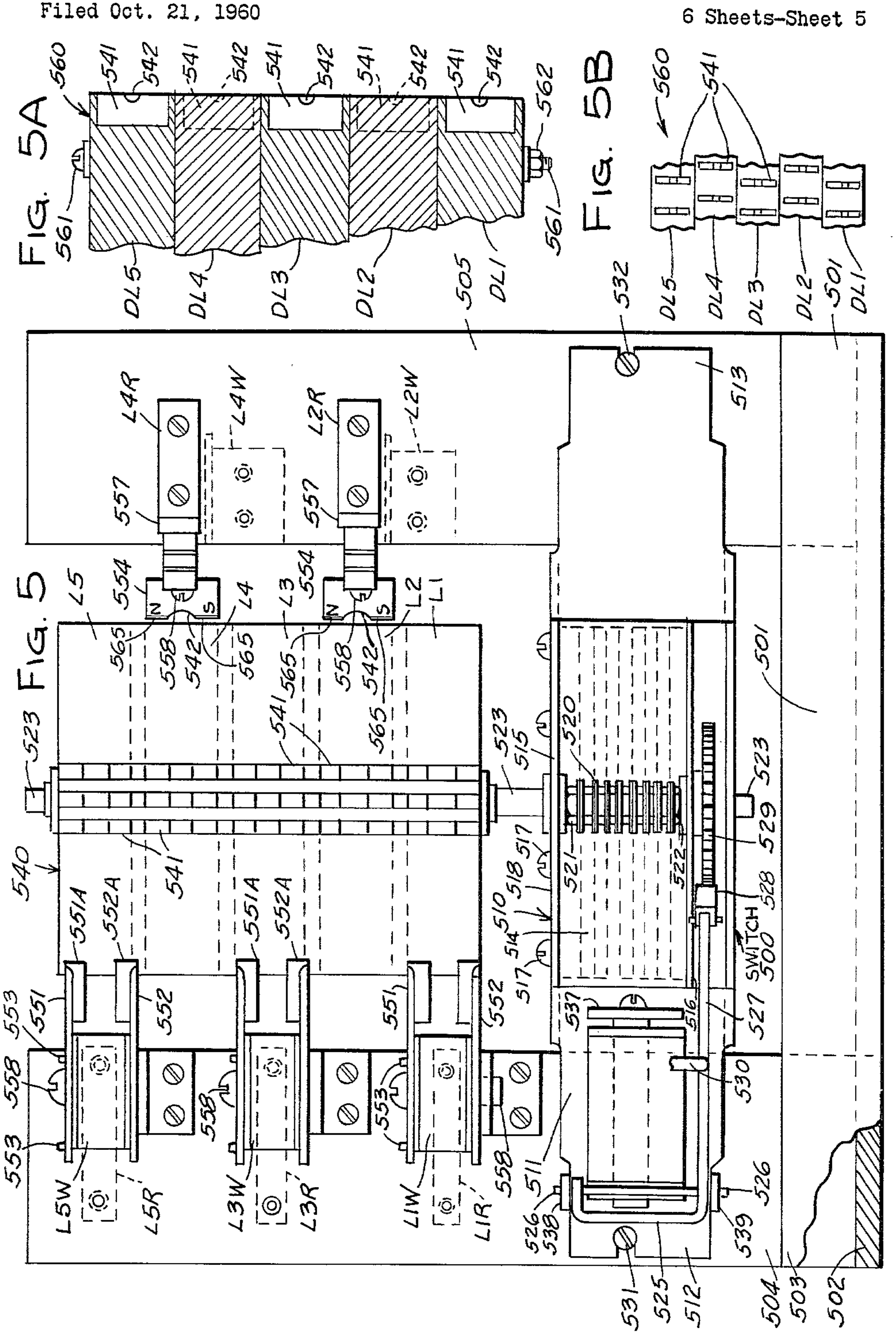
FIG. 5 is a front view of the magnetic memory structure employed in the system of FIGS. 1 to 4.
FIGS. 5A and 5B show a fragmentary front sectional view and a fragmentary front view of a modified drum construction wherein the memory drum comprises a clamped stackup of similar disc-like sections.
Figures 6, 7, 8, 9, 10:
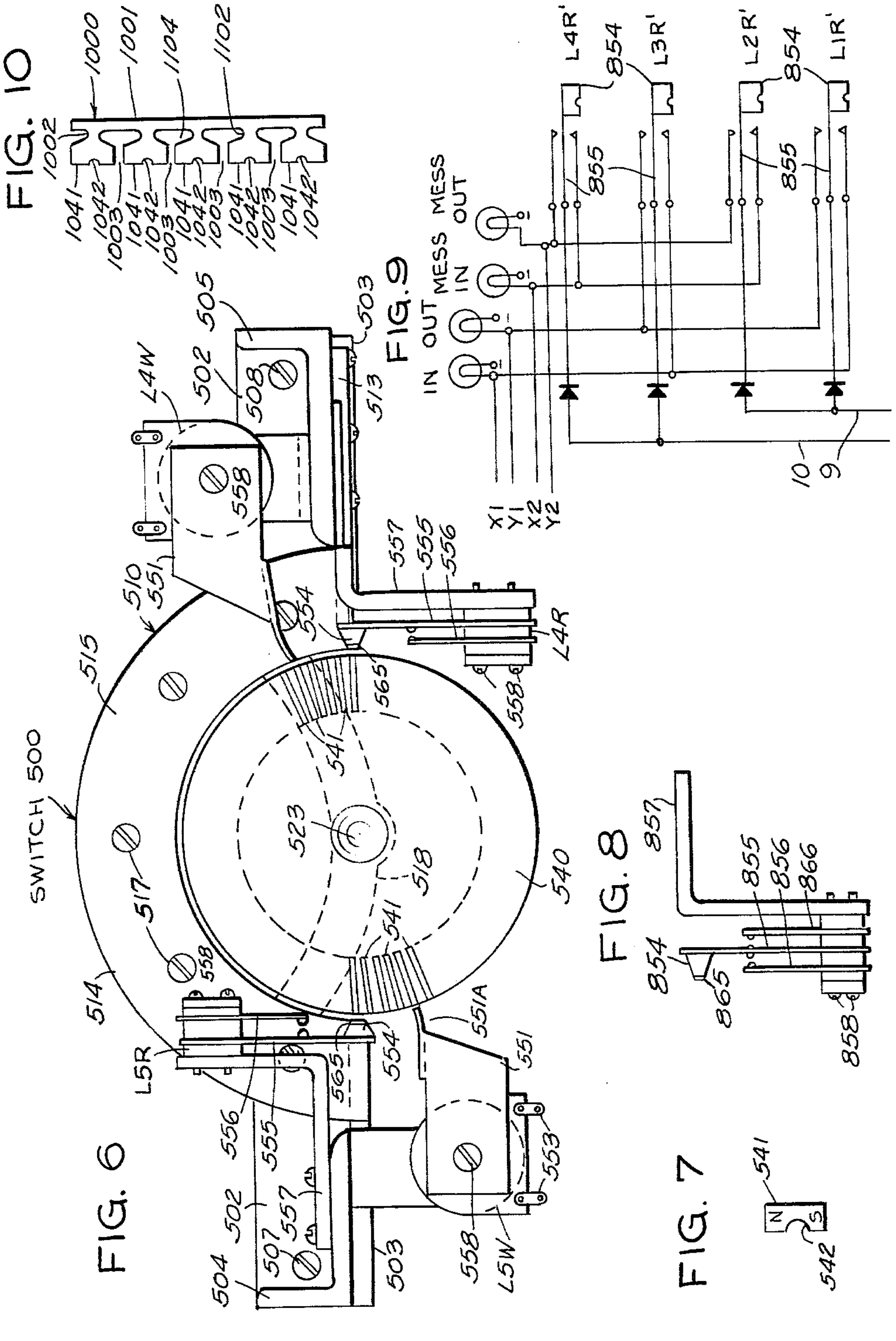
FIG. 6 is a top view of the structure of FIG. 5.
FIG. 7 is a side view of one of the magnetic memory members carried by the drum of FIGS. 5 and 6.
FIG. 8 shows a modified reading-head having three contact blades.
FIG. 9 shows a modified reading-head circuit arrangement for use with the modified reading head of FIG. 8.
FIG. 10 shows a gang strip of memory members to facilitate handling and assembly thereof in the slots of the drum of FIGS. 5 and 6.

*Magnetic memory structure—FIGS. 5 to 7*

The magnetic memory structure of FIGS. 5 to 7 is mounted on upright angle bars 504 and 505, resting on and welded to floor angle bar 501, which has a front vertical web 502 and a horizontal base web 503. Angle bar 501 may be anchored to the floor, as by screws 507, 508 (FIG. 6).

The magnetic memory structure comprises a drum 540 supported on and rotated by shaft 523, carried by the rotary stepping switch structure shown underneath the drum.

Stepping switch 500 may be similar in construction to the well known rotary line switch employed in telephone systems for various switching operations. Its usual construction and use are explained on pages 227 to 230 (including FIGS. 177 and 178) of Telephony Including Automatic Switching by Arthur Bessey Smith, copyright 1924 by Frederick J. Drake & Co., Chicago.

In the drawings, the illustrated switch is mounted on switch frame 511, which has tabs 512 and 513 through which the switch is secured to uprights 504 and 505 by screws 531 and 532. Switch frame 511 is a unitary formed structure which includes arcuate plate 515 which supports the switch bank of contacts 514, clamped together and held between arcuate plate 515 and underlying separate arcuate plate 516 by screws 517. The frame structure further includes the bridged bearing plates 518 and 519 which have openings in which switch shaft 523 is journaled.

Shaft 523 carries a wiper assembly 520 (FIG. 5), clamped between nuts 521 and 522.

Shaft 523 further carries a 50-tooth ratchet wheel 529 for use by stepping magnet 524 in advancing the brushes or wipers step-by-step. Stepping magnet or motor magnet 524 is controlled as hereinafter described to cause it to energize and deenergize its armature 525 as required. Armature 525 acts through armature arm 527 and pawl 528 carried thereby to rotate ratchet wheel 529 until a pre-selected position of the magnetic memory drum is arrived at. Motor magnet 537 is secured to bracket 537, and armature 525 is pivoted at 526 to pivot tabs 538 and 539.

Figure 4:
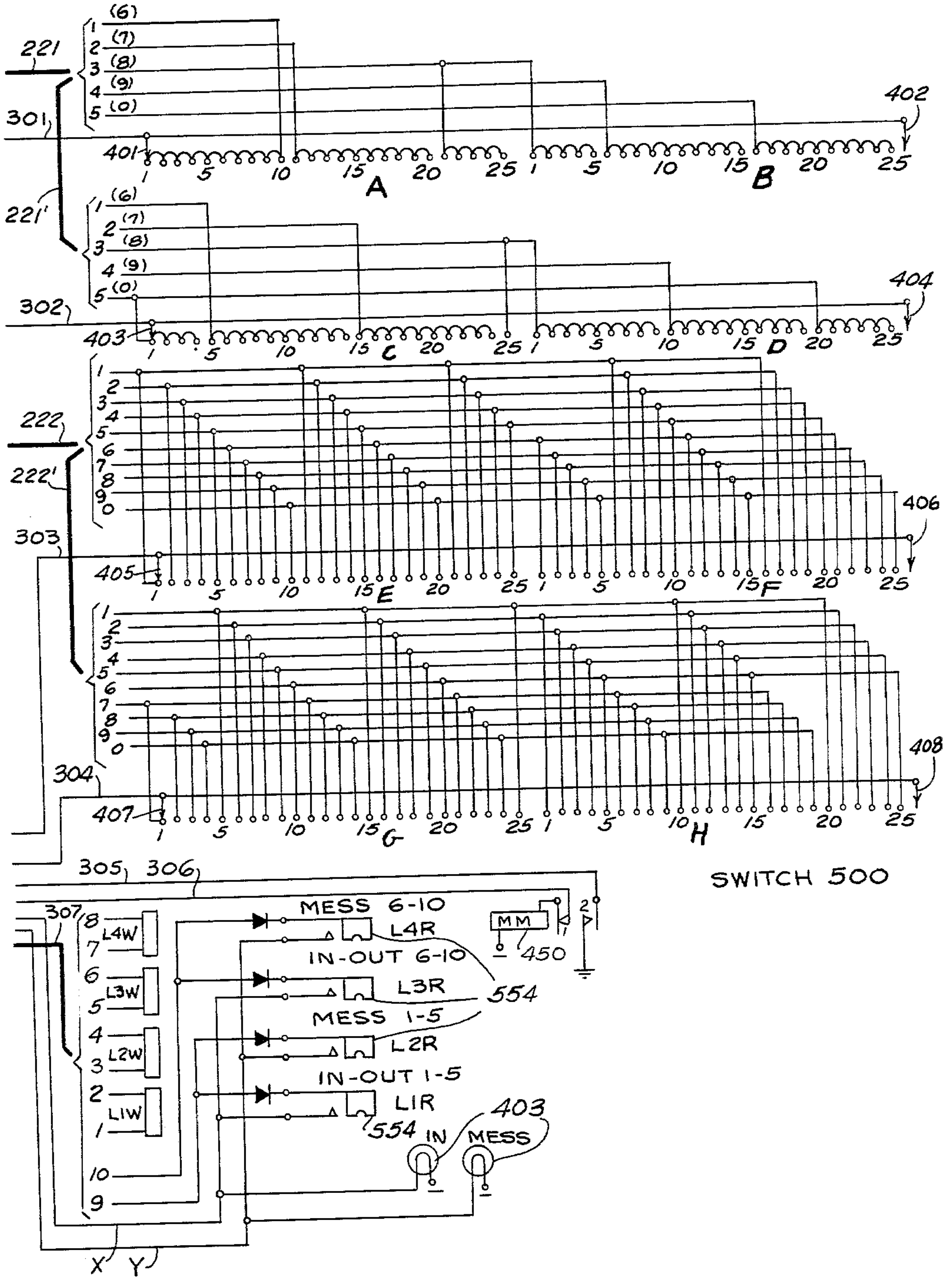

Each of the brushes (401 to 408, FIG. 4) clamped in assembly 520 on shaft 523 is associated with a separate one of eight levels of contacts in bank 514 (A to H, FIG. 4). Each level contains contacts 1 to 25 as shown in circuit diagram in FIG. 4, wherein the contacts of a level are shown in a straight line for convenience of illustration rather than in a semicircle.

It will be observed in FIG. 4 that the brushes 401, 403, 405, and 407 for levels A, C, E, and G are illustrated as positioned on the first contacts of the level, whereas the brushes 402, 404, 406, and 408 are illustrated as positioned one step beyond the 25th contact of their respective levels B, D, F, and H. Each of these brushes is single ended, and is in contact with its bank only half the time during rotation of the switch, as will be hereinafter referred to in the circuit description.

Referring again to FIGS. 5 and 6, the magnetic memory drum 540 has magnetic memory bits 541 embedded therein for effective appearance on the surface of the drum in five levels L1 to L5 (FIG. 5). In any of the levels L1 to L5, there are fifty magnetic members 541 evenly spaced around the circumference of the drum, on 7.2 degree centers. For this purpose, fifty longitudinal radially disposed slots are cut into the surface of drum 540, the slots being on 7.2 degree centers. At each of the evenly spaced levels L1 to L5 of FIG. 5, a magnetic member 541 is inserted into each of the fifty slots, with the left-hand edge thereof as shown in FIG. 7 exposed outwardly to expose the notch 542 therein, which is employed to define upper and lower pole faces along the exposed edge of the member.

The directional north or south magnetization of the selected ones of the magnetic memory members 541 is referred to as writing, and is accomplished by writing heads L1W to L5W for the respective drum levels L1 to L5. The odd-numbered writing heads L1W, L3W, and L5W are mounted on the front side of left upright 504 as shown in FIG. 5, and the even-numbered writing heads L2W and L4W are mounted on the rear side of upright 505. Each writing head comprises an assembly held on an associated mounting bracket by a mounting bolt 558. Each writing head includes a wound electromagnet energizable through its terminals 553 assembled between upper and lower pole pieces 551 and 552. The writing-head electromagnets L1W to L4W are shown in circuit diagram in FIG. 4.

It will be observed that pole pieces 551 and 552 end in downturned and upturned pole-end portions **551*a* and 552*a* which present upper and lower pole faces to the outer edge of associated selected memory members 541. Only a small clearance airgap of perhaps 1/32 inch is left between the pole faces of 551*a* and 552*a*** and the outer surface of the drum and of the memory members.

Preferably, the inserts 541 are of sufficient magnetic hardness that any one of them maintains its imparted polarized magnetic condition indefinitely until another polarized magnetic condition is imposed thereon by the associated one of the writing heads.

The magnetic memory structure also includes reading heads L1R to L5R for the drum levels L1 to L5. Odd-numbered reading heads L1R, L3R, and L5R are mounted on the rear face of the left upright 504, on the opposite side of the upright are the writing heads L1W, L3W, and L5W, while the even-numbered heads L2R and L4R are mounted on the front face of right upright 504, opposite the writing heads L2W and L4W which are mounted on the rear face thereof.

Each reading head L1R to L5R comprises a mounting bracket 557, contact-spring blades 555 and 556, and a pair of clamping screws 558 which maintain blades 555 and 556 tightly assembled with bracket 557 between the illustrated insulating members. Blades 555 and 556 are provided with juxtaposed normally open contact points as illustrated best in FIG. 6, which contact points engage to complete an electrical circuit when the outer end of blade 555 is flexed radially inwardly toward drum 540. The reading of a selected magnetic memory item 541 by a head L1R to L5R is accomplished by a small generally rectangular permanent magnet 554 welded or otherwise secured to the outer end of blade 555 and disposed adjacent the surface of the drum and the outer edge of members 541 of each level L1 to L5, with only a small normal working clearance as of 3/64 inch, for example. This clearance is preferably just sufficient that, upon an attraction of magnet 554 toward the drum by a member 541, effective contact-point engagement is made between blades 555 and 556 to close an effective electrical circuit point. This circuit point is opened when the drum has been rotated until a differently magnetized member 541 has been brought in opposition to read magnet 554.

As shown in FIGS. 5 and 6, each reading-head magnet 554 has a pair of non-magnetic residual-cap members 555 fixed over the tractive pole faces thereof, as by brazing or spot welding. When a magnet 554 is attracted radially inwardly toward the exposed outer pole faces of a magnetic memory member which has been magnetized in the proper direction to attract it (the upper and lower pole faces of the memory member being of south and north polarity respectively), the movement of magnet 554 is stopped by the contact of residual members 555 with the drum or with the pole faces of the memory member 541, leaving a residual magnetic gap between the parts 554 and 541. This gap sets a limit on the inwardly acting tractive force, and limits the magnetic influence which a magnet 554 can have on a memory member 541 to alter its magnetic state.

The residual members 555 also act to prevent a reading magnet 554 from changing the state of magnetization of a memory member which may still be in a neutral magnetic state or which may have been reversely magnetized to repel its reading magnet 554. Their action in this regard occurs when the herein described rotation of the drum may cause vibration of a reading magnet which may momentarily bounce it toward a member 541 which has not been magnetized to attract the reading magnet. By this provision, the drum may be caused to rotate through an indefinite number of cycles without the reading magnets 554 adversely affecting the stored magnetic states or conditions of the memory member 541.

Good results have been obtained when the reading magnets 554 are of the alloy composition commonly known as alnico, which has a high coercivity, and the memory members of the alloy composition known as cobalt steel, which has an intermediate coercivity and is quite readily magnetized in the desired direction by a writing head L1W to L5W with which it is in opposition.

*FIGS. 5A and 5B—Modified drum construction*

The modified drum 560 of FIGS. 5A and 5B differs from the drum 540 of FIGS. 5 and 6 in that it comprises a stackup of five similar disc-like wheels or sections, DL1 to DL5. Any such wheel may be molded with its fifty (or other desired number) memory members 541 imbedded therein in radial upright disposition as shown, with the face containing the pole-separating notch 543 disposed outwardly. A desired number (such as three) of clamp bolts 561 may be passed through the molded wheels (as through holes molded in) to receive nuts 562 which clamp the assembled discs rigidly together.

As shown, the even-numbered wheels DL2 and DL4 are rotated one-half step with respect to the overlying and underlying odd-numbered wheels to provide the level-to-level staggered arrangement of members 541 best seen, in front view, in FIG. 5B. Thereby, improved inter-level isolation between memory members 541 is secured, which promotes reliability of reading-head operation and lessens the tendency of memory members in adjoining levels to be affected to some extent by leakage flux upon magnetization of a writing head to magnetize a memory member brought directly under it.

When the staggered-level construction of FIGS. 5A and 5B is used, the reading and writing heads of levels 2 and 4 are correspondingly displaced one-half step.

*FIG. 10—Modified memory-member construction*

In FIG. 10, a modified construction of the memory members for the drum 540 of FIGS. 5 and 6 is illustrated. The construction comprises a strip 1000 to which each of a desired number of memory members 1041 is left attached by respective neck portions 1002. When this modified construction is provided for the drum 540 of FIGS. 5 and 6, fifty strips 1000 are required, and each strip is inserted into a separate one of the herein described slots in drum 541. The members 1041 of any inserted strip 1000 lie in the respective levels L1 to L5 (FIG. 5) of the drum.

In the strip form, five members 1041 are punched out at a single punch operation, but are left attached together in strip 1000 for ease in handling and for ease of insertion into the drum, since fifty insertions provide 250 memory members 1041, each insertion providing five memory members. When such a strip is inserted, the common portion is at the bottom of the slot, with the face containing pole separation notches 1042 being at the periphery of the drum.

The notches 1003 separate the members 1041 to limit leakage flux between them. This leakage-flux reduction is enhanced by the widening of notches 1003 at 1004 to provide necks 1002, and the notch depth is sufficient to render the intermember portion of strip 1000 relatively narrow as shown.

Tests indicate that the notched strip construction of FIG. 10 is substantially as satisfactory in operation as the individual form of memory member construction.

*FIGS. 1 to 4—The system*

Referring particularly to FIGS. 1 to 4, the signaling system incorporating the structure of FIGS. 5 to 7 will now be explained.

Figure 1:
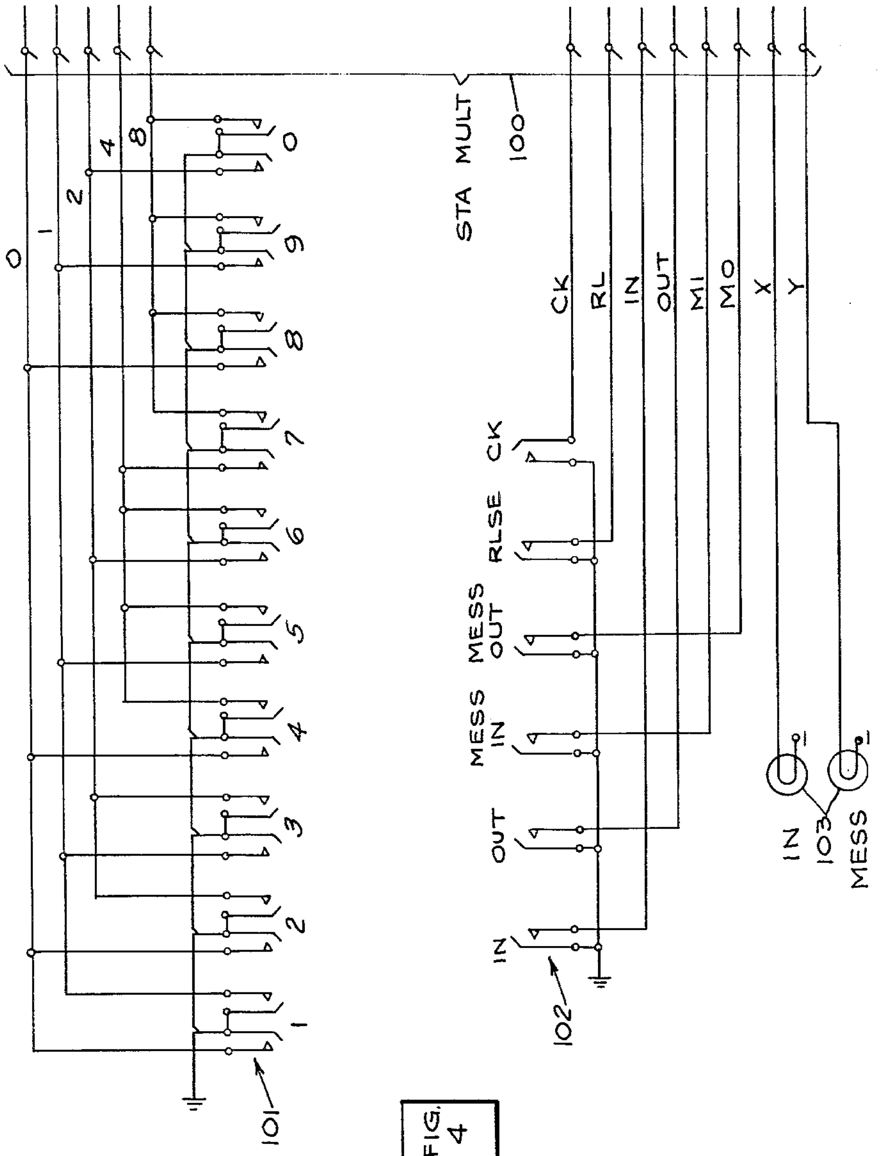
FIGS. 1 to 4 are drawn should be arranged to be understood best.
Figure 11:
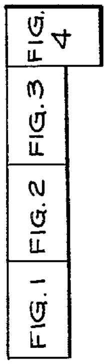
Figure 2:
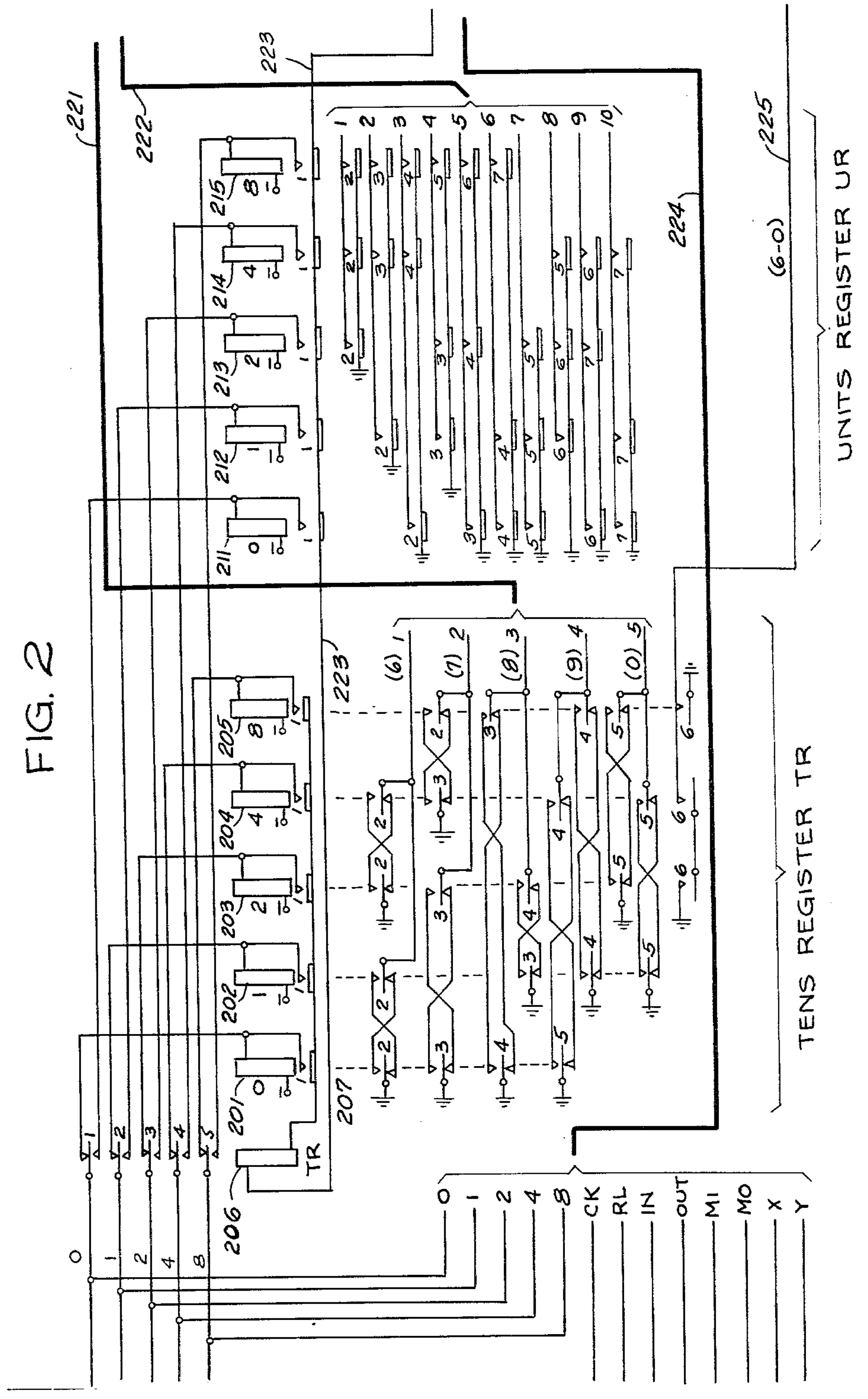
Figure 3:
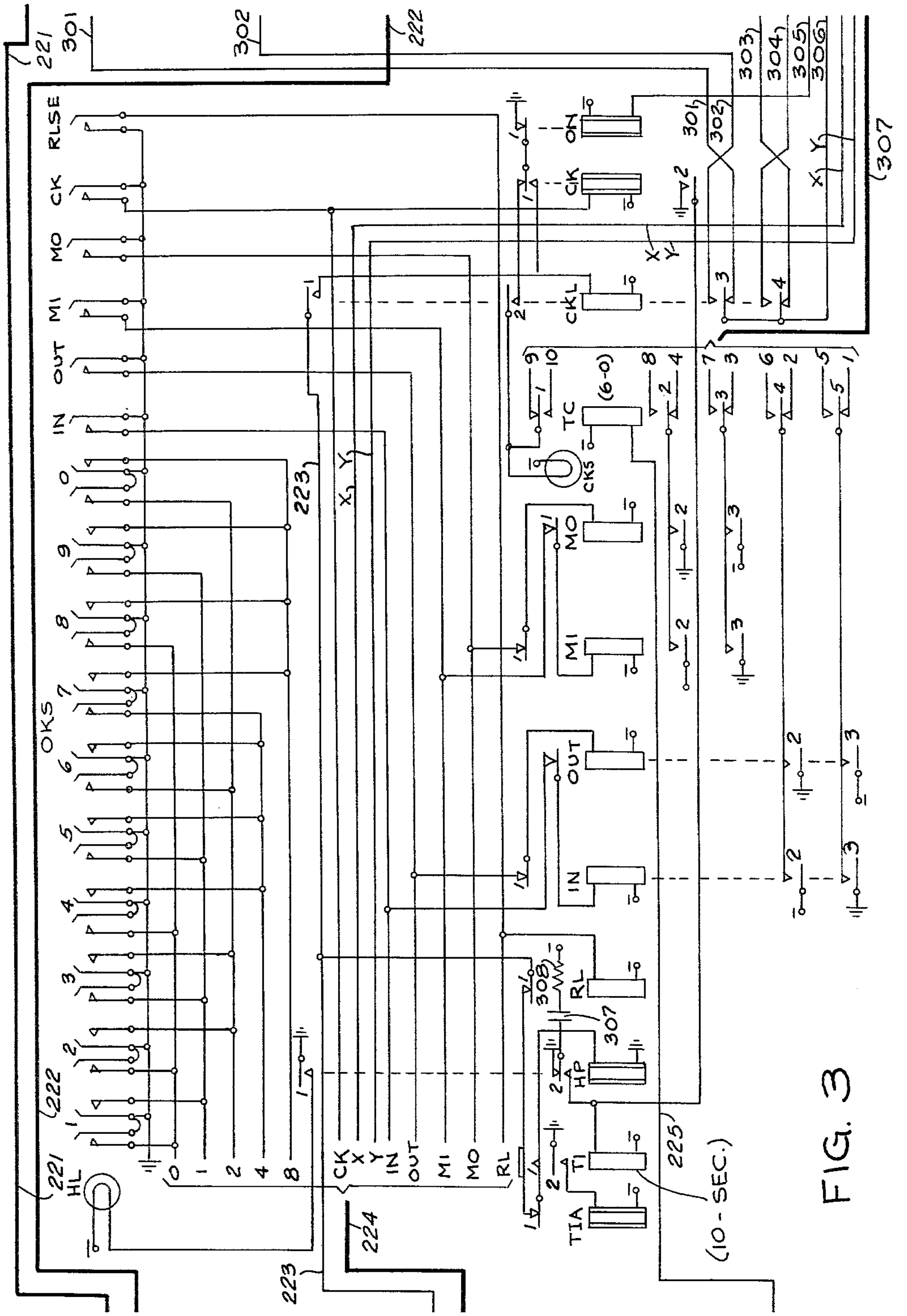

The circuit apparatus of FIGS. 2 to 4 includes the remote station apparatus of FIG. 1. Other remote stations are multiple to the illustrated station as indicated at 100 (FIG. 1).

At the station of FIG. 1, key set 101 is provided comprising a set of digit keys 1 to 0. A set of control and release keys 102 is also provided, along with two signal lamps 103, comprising an in and out signal lamp INS, and a message in or out signal lamp MS.

The remote stations are connected with the central signal apparatus by five coded digit conductors 0 to 8 and by eight miscellaneous control conductors CK to Y.

The disclosed signal system is capable of serving and giving pertinent information to and regarding the personnel, for which purpose each person recognized by the system is assigned a separate one of the one hundred numbers from 11 to 00.

When information is desired concerning any listed person, or when information is to be recorded as to that person, two digit key operations are performed, at keyset 101 (FIG. 1) or at keyset OKS (FIG. 3), to record the tens and units digits of the number in the tens register TR of FIG. 2 and in the associated units register UR, pursuant to which and following which operations occur as will be detailed.

*Recording number 15*

When the number 15 is to be recorded through the digit keys of keyset 101 of FIG. 1, digit key 1 is first depressed momentarily and then released, following which the digit key 5 is depressed momentarily and then released.

When digit key 1 is depressed, the associated wires 0 and 1 leading to the tens register TR through contacts of transfer relay 206 are both grounded, energizing relays 0 and 1 of the tens register TR (FIG. 2), energizing current being supplied from a central source of direct current which has its positive pole grounded and has its negative pole ungrounded, as indicated by the negative signs appearing in the drawings adjacent to relays and other items to be energized by the central source.

At its contacts 1, each of the relays 201 and 202 locks to ground on conductor 207 through the winding of transfer relay 206 and the common locking conductor 223. Locking conductor 223 is normally supplied with a ground connection through contacts 1 of release relay RL, contacts 1 of relay T1A, and thence through the low-resistance slow-release hold-pilot relay HP. Neither transfer relay 206 nor hold-pilot relay HP operates while digit key 1 is held depressed, since these relays are short circuited by ground potential supplied directly to the windings of relays 201 and 202 from keyset 101, over conductors 0 and 1. When the digit-1 key in set 101 is released, relays 201 and 202 remain locked operated, and transfer relay 206 is energized in the locking circuit and over the common locking conductor 223, along with hold-pilot relay HP.

Relay 206 operates when energized. Its transfer contacts 1 to 5 disconnect the associated conductors 0 to 8 from the windings of relays 201 to 205 of tens register TR and transfers them to the windings of the corresponding relays 211 to 215 of units register UR.

When key 5 of set 101 is momentarily depressed in accordance with the units digit 5 in the number, the associated conductors 1 and 4 are grounded, thereby energizing relays 212 and 214 of units register UR through contacts of the operated transfer relay 206. Each of the operated units relays 212 and 214 locks operated at its contacts 1 to the normally grounded holding conductor 223, wherefore it remains energized after the digit key 5 at the station of FIG. 1 has been restored.

For convenience in appreciating the digit transmittal and recordal arrangement, the following code table is provided:

CODE TABLE

| Digit | Code | Units |
|---|---|---|
| 1 | 0 | 1 |
| 2 | 0 | 2 |
| 3 | 1 | 2 |
| 4 | 0 | 4 |
| 5 | 1 | 4 |
| 6 | 2 | 4 |
| 7 | 4 | 8 |
| 8 | 0 | 8 |
| 9 | 1 | 8 |
| 0 | 2 | 8 |

This code table is that commonly used for the well-known two-out-of-five code which is extensively employed in the telephone switching industry.

With relays 201 and 202 of tens register TR operated and locked as described, the associated tens conductors 1 to 5 in cable 221 are conditioned according to the tens digit 1 to control the tens setting of the switch 500, shown in circuit diagram in FIG. 4. For this purpose, conductor 1 of cable 221 is ungrounded, and ground is supplied to the remaining tens conductors 2 to 5 of cable 221. Conductor 1 of cable 221 is not grounded, despite contacts 2 of each of the relays 201 and 202, since the circuit partially closed at the front contact 2 of each is opened at the back contact 2 of the other.

Conductor 2 of cable 221 is grounded through front contact 3 of relay 201 and back contact 3 of relay 205; conductor 3 of 221 is energized through front contact 4 of relay 201 and back contact 3 of relay 205; conductor 4 is energized through front contact 5 of relay 201 and back contact 4 of relay 204, as well as through front contact 4 of relay 201 and through back contact 4 of relay 205; and conductor 5 is energized through front contact 5 of relay 202 and back contact 5 of relay 204.

Referring to FIG. 4, switch 500 is now rotated until neither of its brushes 401, 402 encounters any one of the grounded conductors 2, 3, 4, and 5 in cable 221. The circuit is from ground on any one of the last mentioned conductors and a contact in bank level A or B of switch 500, brush 401 or 402, conductor 301, back contact 3 of relay CKL, conductor 306, self-interrupter contacts 1 of motor magnet 450, and thence through the winding of magnet 450 to the negative pole of the common current source. The stepping action of motor magnet 450 is induced by the self-interrupting contact 1 included in the above traced circuit. The brushes 401 and 402 are thus rotated (along with brushes 403 to 408) until contacts 1 of bank section A of switch 500 is engaged by brush 401, whereupon the stepping circuit is opened since conductor 1 in cable 221 (connected to contacts 1 to 10 of level A) is not grounded.

In the units register UR, relays 212 and 214 of units register UR, which have operated and locked as described to record the units digit 5, have grounded units conductors 1 to 4 and 6 to 0 in cable 222, being all of the conductors in that cable except units conductor 5, which corresponds to the registered units digit 5. Specifically, conductors 1 to 3 are grounded by contacts 2 to 4 of relay 214 (conductor 2 being also grounded by contacts 2 of relay 212); conductor 4 is grounded by contacts 3 of relay 212; conductor 5 is not grounded; conductors 6, 7, and 8 are grounded by contacts 4, 5 and 6 of relay 212 (conductor 8 being also grounded by contacts 5 of 214); conductor 9 is grounded by contacts 5 and 6 of relay 214; and conductor 0 is grounded by contacts 7 of relay 212.

Responsive to the noted grounding of conductors 1 to 4 and 6 to 0 in cable 222, brush 405 (with which brush 407 is multipled) is energized from one or another of the grounded conductors to cause stepping action as described to be resumed and to continue until brush 405 is brought into engagement with its contacts 5, which corresponds to the registered number 15. The stepping circuit for the units advanced is over any grounded one of the conductors 1 to 4 or of 6 to 0 in cable 222, and thence over brush 405, conductor 302, back contact 4 of relay CKL, conductor 306, and thence to the current source by way of motor magnet 450 as previously traced. The stepping action is stopped for the want of a driving circuit when brush 405 encounters the described ungrounded conductor 5 of cable 222, now ungrounded in units register UR as described.

By the described action of stepping switch 500, magnetic memory drum 540 of FIGS. 5 and 6 has been rotated to bring under the writing heads L1W and L2W the memory members 541 which correspond to number 15.

If the person to which the recorded number 15 is assigned has just arrived on the premises and desires to record that fact, he now momentarily operates button IN of set 102, thereby grounding conductor IN in cable 224, which closes a circuit through contacts 1 of relay OUT for relay IN. Contracts 1 of relay IN disconnect relay OUT to preclude a simultaneous operation of the latter relay. Its contacts 2 and 3 place a ground potential and a negative potential through back contacts 4 and 5 of relay IC on conductors 1 and 2 of cable 307, which conductors lead to level 1 write magnet L1W as shown in FIG. 4. Magnet L1W is accordingly energized in the corresponding direction to thereby magnetize the selected magnetic memory bit 541 in level L1 of drum 540 which corresponds to number 15. This momentary magnetization of the selected memory bits conditions that bit to give an IN signal when a query is later made respecting number 15, relay IN restoring when key IN of 102 is restored.

*Clearing out*

Upon its described energization over hold conductor 223 upon the depression of the first key in keyset 101, hold-pilot relay HP at its contacts 1 lights hold lamp HL as a hold signal, at its contacts 2, it transfers the left-hand terminal of the normally charged condenser 307 from ground to the upper winding terminal of timer relay TI. Relay TI is thereupon operated in the discharge circuit of large-capacity electrolytic condenser 307. Relay TI is adjusted to remain operated in the discharge circuit of 307 for about ten seconds. Contacts 1 of relay TI shunt contacts 1 of timer auxiliary relay TIA, and its contacts 2 of TI operate timer auxiliary relay TIA. Contacts 1 of relay TIA open the initial holding ground circuit, but without immediate effect as these contacts have been shunted at contacts 1 of TI.

When relay TI restores at the end of the noted ten-second interval, its contacts 1 open the holding circuit path for as long as an interval as relay TIA remains operated, and its contacts 2 open the circuit of relay TIA. Slow-releasing relay TIA is adjusted to remain operated for perhaps a quarter of a second, whereupon it restores and again closes the holding circuit by connecting ground through relay HP to conductor 223.

Responsive to the described temporary opening of the holding circuit (ungrounding hold conductor 223), transfer relay 206 and digit relays 201 and 202 of tens register TR restore, along with the energized digit relays 212 and 214 of units register UR, thereby completing the clearing-out operation.

The brushes of the switch 500 of FIG. 4 remain in the position where last used, being operated from that position to the desired new one on the next number operation of the apparatus.

If, when the setting for number 15 is made as described, the person to which number 15 is assigned is about to leave the premises, he operates the key OUT of set 102 rather than the key IN. In this event out relay OUT is operated in place of relay IN, being operated over conductor OUT of cable 224. Contacts 1 of OUT disconnect IN, and contacts 2 and 3 of OUT close a circuit as previously described for writing magnet L1W of FIG. 4 but of the opposite polarity. That is, ground (instead of the negative pole of the current source) is connected to conductor 2 of cable 307, and the negative pole of the current source (instead of ground), is connected to conductor 1 of cable 307. The selected memory bit is thus magnetized in the opposite direction upon the consequent energization of magnet L1W.

By using the operator's keyset OKS, the operator at the central control apparatus can cause number 15 (as well as any other number 11 to 00) to be set up on the registers TR and UR as described, causing the energization of relays 206, 201, and 202 of tens register TR and causing the energization of relays 212 and 214 of units register UR, as described. The switch 500 of FIG. 4 is thereupon set as described, with its brushes 401, 403, 405, and 407 on their respective contacts 5. The operator may now press key MI of the keyset OKS, thereby operating the message-in relay MI through contacts 1 of the message-out relay MO. Contacts 1 of MI disconnect MO, and contacts 2 and 3 thereof place battery (the negative pole of the current source) and ground on conductors 4 and 3 respectively of cable 307, thereby energizing write magnet L2W in the corresponding direction. The magnetic memory bit which has been brought into association with L2W (the fifth bit in the second level L2 of memory bits 541) is thereby magnetized in a direction to indicate that a message is waiting for number 15.

When the message being held for person number 15 has been delivered, the operator again sets up the number 15 on the digit keys of OKS and then actuates the message-out key MO instead of the message-in key MI, thereby operating relay MO instead of relay MI, with the same result except that the circuit now closed for magnet L2W is in the opposite direction, thereby magnetizing the selected memory bit in the opposite direction to record the fact that there is no longer a message being held for person number 15.

If a person at the station of FIG. 1 desires to check the information recorded for any one of the numbers 11 to 00, he may do so by depressing the digit keys 101 accordingly. For example, if information is desired as to what is recorded for number 15 the keys 1 and 5 of set 101 are depressed momentarily and in sequence as herein described, causing the described recordation of number 15 at registers TR and UR of FIG. 2, which causes the described setting of switch 500 for number 15.

The inquiring person now operates check key CK of set 102, thereby grounding conductor CK in cable 224 to momentarily operate the slow-restoring check relay CK.

Contacts 2 of relay CK close a direct holding circuit for timer relay TI and a recharging circuit for condenser 307 (relay HP being operated at this time), thereby again fully charging timing condenser 307 to give the required additional time for the checking operation. Contacts 1 of relay CK operate check-lock relay CKL by way of contacts 1 of relay ON. At its contacts 1, relay CKL locks itself to the common holding conductor 223, while at its contacts 3 and 4 it disconnects driving conductor 306 of switch 500 from conductors 301 and 303 and transfers it to conductors 302 and 304. Conductor 302 is connected to C and D brushes 403 and 404 of switch 500, while conductor 304 is connected to G and H brushes 407 and 408. As a result, the switch 500 is reset by control over conductor 302 and 304 until each of the wipers 403 and 407 is resting on an ungrounded contact. With the brushes having previously been driven to their writing position (on their contacts 5) for number 15, brush 403 is already engaging an ungrounded contact since the fifth contact in level C is connected to the ungrounded tens conductor 1 in tens cable 221, but the contact engaged by brush 407 is ground since it is connected with grounded conductor 1 of units cable 222. The described driving circuit of switch 500 is thus again closed, and remains closed, over brush 407, conductor 304, and front contact 4 of relay CKL, until switch 500 has taken four steps, which advance brushes 401 to 408 until brushes 401, 403, 405, and 407 have been stepped to engage their respective contacts 9. The advance then stops since brush 407 is then in engagement with the ungrounded units conductor 5 of cable 222.

As shown in FIG. 4, four steps of switch 500 are required to rotate drum 540 four steps from the writing position of any memory 541 to the reading position thereof. The writing position for any such bit is that position in which it is directly opposed to the pole ends 551*a* and 552*a* of its associated writing magnet L1W to L5W, and it is in reading position when it has been advanced four steps from writing position to come opposite the reading magnet 554 of its associated reading head L1R to L5R. That is, when the drum is rotated four steps in a clockwise direction from a writing position, any memory bit 541 which was opposed to the writing head of any level is brought in opposed position to the reading head of that level. Each of the reading heads L1R to L5R carries a permanent magnet 554 as described. Each such permanent magnet may have its north pole at the top and its south pole at the bottom as indicated in FIG. 5 for magnets 554 of reading heads L2R and L4R. If the bit 541 now opposed to the reading head is magnetized in an IN direction, by a relay IN or MI as described, the magnet 554 is attracted and closes its contact members 555 and 556, whereas it is repelled (to hold its contacts open) if the bit is oppositely magnetized (by OUT or MO).

During the described four-step stepping operation from writing position to reading position, slow-restoring off-normal relay ON is operated over conductor 305 by contacts 2 of switch 450 and remains operated until the stepping operation is completed. Then, with relays CK and ON restored, and with CKL operated and locked as described, ground is extended through contacts 1 of the restored relays CK and ON, contacts 2 of CKL, to light check-signal lamp CKS, and is further extended through back contact 1 of relay IT to conductor 9 in cable 307. Conductor 9 is connected to the upper reading contact of heads L1R and L2R through respective diode rectifiers which preclude unwanted back-up circuits. If the contacts of reading head L1R are closed, the ground received over conductor 9 is extended to conductor X of cable 224 thereby lighting lamp IN403 of FIG. 4 and lamp IN103 of FIG. 1. The lighting of these lamps indicates that person number 15 is IN (on the premises). When these lamps fail to light, they thereby indicate that the person whose number is recorded is OUT (off the premises).

If the contacts of the first level reading head L1R are closed, the ground on conductor 9 of cable 307 is extended to conductor Y of cable 224, thereby lighting message lamp MESS 103 and MESS 403. The lighting of these lamps indicates that there is a message for the person whose number has been recorded on registers TR and UR of FIG. 2. The failure of these lamps to light at this time thereby indicates that no message is being held for the person last noted.

Release key RLSE is provided in set 102 of FIG. 1 and in set OKS of FIG. 3 for use when relays TIA and TI of FIG. 3 are not provided for the described automatic clearing-out operation. When these two relays are omitted, ground is connected to the back contact 1 of relay RL and normally passes therethrough to holding conductor 223. Then, when release key RLSE is operated at keyset 102 or at keyset OKS, relay RL is thereby momentarily energized to disconnect ground from conductor 223, releasing any and all relays locked thereto.

When relays TI and TIA are not provided to secure the described automatic clearout, hold-pilot relay HP requires only its contact set 1, which maintains hold-pilot lamp HL lighted as a hold signal following the beginning of any registering operation at TR and UR until release relay RL is operated. In the absence of automatic clearing out, the operator at OKS often may have to press her key RLSE to clear out a setting made from a remote station and not followed by operation of RLSE key of set 102.

*Control of switch setting*

Considering brush 401 and level A of switch 500, the contacts 1 to 25 in that level comprise a semicircular level of contacts in contact bank 514 of FIGS. 5 and 6, being the topmost one of eight contact-bank levels. The contacts 1 to 25 in bank level A correspond respectively to twenty-five of the fifty magnetic memory bits 541 in any of the levels L1 to L5 of the drum. The remaining twenty-five contacts in any level L1 to L5 of the magnetic memory drum correspond respectively to bank contacts 1 to 25 of the next underlying level B of switch 500.

In one-half revolution (twenty-five steps) of switch 500, brush 401 successively engages the twenty-five contacts of level A, but does not engage any contacts of the switch bank on the next twenty-five steps of the switch. At that time, however, brush 402, connected directly with brush 401 by conductor 301, successively engages contacts 1 to 25 of level B of the switch. When either of the brushes 401, 402 steps off its twenty-fifth contact, the other one of the two brushes steps onto its first contact. The immediately foregoing remarks apply equally to switch levels B and D, E and F, and G and H, which levels are provided with linked brushes 403 and 404, 405 and 406, and 407 and 408.

The described further hunting action of switch 500 to advance it four steps from a reading setting into a corresponding writing setting is controlled through levels C and D and levels G and H over conductors 1 to 5 in cable 221' and conductors 1 to 10 in cable 222'. It will be observed that the multipling of conductors 1 to 5 to the bank contacts in levels C and D represents a slip of four with respect to the multipling at levels A and C. For example, conductor 1 starts at contact 1 of level A, but starts at contact 5 of level C; conductor 2 starts at contact 11 of level A, but starts at contact 15 of level C; conductor 3 starts at contact 21 of level A, but starts at contact 25 of level C; conductor 4 starts at contact 6 of level B, but starts at contact 10 of level D; and conductor 5 starts at contact 16 of level B, but starts at contact 20 of level D.

Similarly, the multipling of the units conductors 1 to 10 of cable 221 to the contacts in levels G and H represents a slip of four with respect to the multipling of these conductors 1 to 10 to levels E and F. For example, conductor 1 connects to contacts 1, 11, and 21 in level E, and 6 and 16 in level F, while it connects to contacts 5, 15, and 25 in level G and to 10 and 20 in level F.

Units conductors 2 to 10 have a similar slip of four, it will be observed, between levels EF, and levels GH.

It has hereinbefore been explained that conductors 1 to 5 in tens group 221 correspond respectively to tens digits 1 to 5 recorded on register TR, and that the recordal of any digit 1 to 5 causes the corresponding one of the conductors 1 to 5 to remain ungrounded, while causing all of the other ones of these five conductors to become grounded. The conductors 1 to 5 in cable 221 also correspond respectively to tens digits 6 to 0. When any one of the digits 6 to 0 is recorded in the register the corresponding one of the conductors 1 to 5 in cable 221 remains ungrounded, and ground is placed on the remaining four conductors of the five. Thus, tens digit 6 acts at TR as the tens digit 1; tens digit 7 acts as tens digit 2; tens digit 8 acts as tens digit 3; tens digit 9 acts as tens digit 4; and tens digit 0 acts as tens digit 5. Thus, while there are one hundred two-digit number 11 to 00, only fifty positions of the switch 500 are required, since each of these fifty positions corresponding to two different two-digit numbers.

In order to provide a clear distinction between the fifty numbers 11 to 50 and the fifty numbers 51 to 00, the 6–0 conductor 225 is provided to control the 6–0 tens-control relay TC. Conductor 225 is left ungrounded for any tens setting 0 to 5 of register TR, but is grounded for any tens setting 6–0. When TR is set for the tens digit 6, relays 203 and 204 are both operated, and their contacts 6 ground conductor 225 and when TR is set for any tens digit 7 to 0, relay 205 is operated. Its contact 6 grounds conductor 225.

When tens-control relay TC is operated, over conductor 225 (grounded responsive to the tens digit recorded at TR having any value from 6 to 0), its contacts 2 to 5 disconnect the conductors controlled by relays IN, OUT, MI and MO from conductors 1 to 4 in cable 307 and transfer them to conductors 5 to 8 in cable 207, thereby substituting 51 to 00 writing heads L3W and L4W for 11 to 50 writing heads L1W and L2W. Levels L3 and L4 of the memory drum accordingly accommodate record information concerning numbers 61 to 00. At its contacts 1 it disconnects signal ground from conductor 9 of cable 307 and transfers it to conductor 10 of that cable, thereby rendering ineffective the first level and second level reading heads L1R and L2R used for numbers 11 to 50, and rendering effective the third level and fourth level reading heads L3R and L4R, used for numbers 61 to 00. Information recorded by writing heads L3W and L4W with respect to the numbers 61 to 00 is imparted through lamps 403 and 103 over conductors X and Y of cable 224 by reading heads L3R and L4R as described for these conductors and lamps in connection with the imparting by reading heads L1R and L2R of information recorded on drum levels L1 and L2 by writing heads L1W and L2W.

The following table of drum-level uses is inserted as an aid in recalling the uses made of the four drum levels L1 to L4:

| Drum Level | Level Use | Writing Head | Reading Head | Numbers | Relay TC |
|---|---|---|---|---|---|
| L1 | IN-OUT | L1W | L1R | 11–50 | Restored. |
| L2 | MESS | L2W | L2R | 11–50 | Restored. |
| L3 | IN-OUT | L3W | L3R | 61–00 | Operated. |
| L4 | MESS | L4W | L4R | 61–00 | Operated. |

*Modification—FIGS. 8 and 9*

FIG. 8 shows a modified reading head for use at any one of the reading-head locations L1R' to L4R' of FIG. 9, being a modification of any one of the reading heads L1R to L5R of FIGS. 5 and 6.

Unlike the reading heads L1R to L5R, each of which includes but two contact blades, the reading head of FIG. 8 has three contact blades 855, 856, and 866. They are clamped together between the illustrated insulators by screws 858 in a stackup supported by bracket 857. Bracket 857, stackup-clamp screws 858, contact blades 855 and 856, and magnet 854, correspond respectively to parts 557, 558, 555, 556, and 554 of FIGS. 5 and 6. The new part in FIG. 8 is the added contact blade 866, which is electrically engaged or contacted by blade 855 when reading-head magnet 854 is repelled by a memory member 541 which has been reversely magnetized as described (by relay OUT or MO) to impart a negative or OUT condition thereto. Contact blade 856, it will be understood, is engaged by contact blade 855 when the magnet 854 carried by 855 is attracted to a memory member 541 which has been forwardly magnetized (by relay IN or MI), as described for heads L1R to L4R of FIG. 4.

In FIG. 10, the 1–5 and 6–0 conductors 9 and 10 of FIG. 4 extend respectively to contact blade 855 of reading heads L1R' and L2R', and to blade 855 of heads 13R' and L4R'.

When the recorded tens digit has a value of from 1 to 5, conductor 9 is grounded as described when the switch 500 of FIG. 4 is set to reading position as described. Then, if the memory member 541 encountered by reading head L1R' stands magnetized to record an IN condition, magnet 854 of L1R' is attracted to move its contact blade 855 downwardly, energizing conductor X1 and lighting lamp IN. However, if the memory member 541 associated with head L1W stands reversely magnetized to record an OUT condition, magnet 854 of L1R' is repelled, moving its blade 855 upwardly to ground conductor Y1 and light lamp OUT. Similarly reading head L2R' is attracted downwardly to ground conductor X2 and light lamp MESS IN or is repelled upwardly to ground conductor YZ and light MESS OUT, according to whether the associated memory member 541 stands magnetized forwardly or reversely.

The conductors X1 and X2 replace conductor X of cable 224, and conductors Y1 and Y2 replace conductor Y of 224. These conductors extend to a four-lamp set at the remote stations (the station of FIG. 1 and its multiples) which replaces the two-lamp set 103 of FIG. 1.

While I have described above the principles of my invention in connection with specific apparatus, it is to be clearly understood that this description is made only by way of example and not as a limitation to the scope of my invention.

I claim:

1. An information recording and repeating system having magnetic memory structure mounted for a driving movement comprising a movable cylindrical recording medium having magnetic memory members peripherally imbedded therein in parallel rows, separate magnetizing writing heads and magnetism detecting reading heads spaced apart along each row in association with the memory members, said magnetic reading heads comprising permanent magnets, contact means attached to said permanent magnets to be operated responsive to the movement of said permanent magnets, a stepping switch, and means for mounting said cylindrical medium on the shaft of said stepping switch for selectively driving the recording medium to bring any desired memory member of any row into operative association with its associated writing head for writing thereinto and for bringing any desired memory member into operative association with its associated reading head for causing movement of said permanent magnet for reading from said desired memory member.

2. A magnetic memory structure according to claim 1, wherein the said memory members of any row are displaced along the row to lie between the memory members of any adjacent row, whereby the inter-row separation of the memory members is increased.

3. A magnetic memory structure according to claim 1, wherein the said cylindrical recording medium comprises a stackup of similar disc-like wheels, with each wheel carrying a separate circular row of said memory members disposed evenly around the periphery of the wheel.

4. A magnetic memory structure according to claim 3, wherein each said wheel is so disposed rotationally with respect to the other wheels that the said memory members thereof are displaced from the positions occupied by the memory members of any adjoining wheel that they lie between the last said memory members.

5. A magnetic memory structure according to claim 1, wherein the cylindrical surface of the recording medium has a series of uniformly spaced longitudinal slots extending around the periphery thereof, the said magnetic memory members being retained in the said slots and each being magnetically hard and having magnetic poles longitudinally displaced along the slots.

6. A magnetic memory structure according to claim 5, wherein each said slot is radial, and wherein each said magnetic member has a pair of pole faces at the outer surface of the said recording medium.

7. A magnetic memory structure according to claim 6, wherein all of the said memory members retained in the same said slot comprise integral parts of the same magnetic strip received in such slot, the strip being notched to provide magnetic separation between adjacent memory members.

8. An information recording and repeating system having a magnetic memory structure comprising a rotary stepping switch having a contact bank, and having a set of brushes for making contact therewith, a rotatable shaft on which the set of brushes is mounted for cooperative rotation around the contact bank, means for stepping the shaft around to rotate the brushes, a non-magnetic drum mounted on the switch shaft with the axis of the drum coinciding with the shaft, magnetic memory members imbedded in the drum and each of said magnetic memory members having a pair of pole faces exposed at the outer cylindrical surface thereof, the memory members being disposed in successive levels or bands encircling the drum and longitudinally displaced therealong, writing head means associated with each of said levels for changing the magnetic state of certain said memory members, means for selecting said certain memory members in accordance with information to be recorded, reading heads associated with each of said levels for detecting the magnetic state of certain of said memory members, said reading head means comprising permanent magnet means, contact means associated with said permanent magnet means operated responsive to movement of said permanent magnet means, and means for selecting said certain of said memory members in accordance with information to be repeated to position said selected memory member in juxtaposition to said reading head means for causing movement of said magnet means.

References Cited by the Examiner

UNITED STATES PATENTS

| | | | |
|---|---|---|---|
| 2,168,149 | 8/39 | Arnold | 340—151 |
| 2,748,373 | 5/56 | Hosmer | 340—151 |
| 2,770,796 | 11/56 | Boer | 340—174.1 |
| 2,810,868 | 10/57 | Hodgson | 317—158 |
| 2,853,657 | 9/58 | Hofacker | 317—158 |
| 2,931,691 | 4/60 | Curtis et al. | 346—74 |
| 2,932,697 | 4/60 | Bogen et al. | 179—100.2 |
| 2,952,010 | 9/60 | Demer et al. | 340—174.1 |
| 2,954,267 | 9/60 | Canepa | 346—74 |
| 2,995,632 | 8/61 | Daniels | 179—100.2 |
| 2,998,495 | 8/61 | Maxey | 340—174.1 |
| 3,119,110 | 1/64 | Coombs | 346—74 |
| 3,138,790 | 6/64 | Trimble | 340—174.1 |

IRVING L. SRAGOW, *Primary Examiner.*

STEPHEN W. CAPELLI, *Examiner.*